United States Patent
Porat et al.

(10) Patent No.: US 9,780,846 B2
(45) Date of Patent: *Oct. 3, 2017

(54) PEAK TO AVERAGE POWER RATIO (PAPR) REDUCTION FOR REPETITION MODE WITHIN SINGLE USER, MULTIPLE USER, MULTIPLE ACCESS, AND/OR MIMO WIRELESS COMMUNICATION

(71) Applicant: BROADCOM CORPORATION, Irvine, CA (US)

(72) Inventors: Ron Porat, San Diego, CA (US); Jun Zheng, San Diego, CA (US)

(73) Assignee: AVAGO TECHNOLOGIES GENERAL IP (SINGAPORE) PTE, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,360

(22) Filed: May 23, 2016

(65) Prior Publication Data

US 2016/0269083 A1 Sep. 15, 2016

Related U.S. Application Data

(63) Continuation of application No. 13/954,492, filed on Jul. 30, 2013, now Pat. No. 9,350,505, which is a (Continued)

(51) Int. Cl.
*H04L 27/34* (2006.01)
*H04B 7/0413* (2017.01)
(Continued)

(52) U.S. Cl.
CPC ....... *H04B 7/0413* (2013.01); *H04L 27/2621* (2013.01); *H04B 2201/70706* (2013.01);
(Continued)

(58) Field of Classification Search
None
See application file for complete search history.

(56) References Cited

U.S. PATENT DOCUMENTS

2004/0008616 A1* 1/2004 Jung ................... H04L 27/2621
370/203
2004/0136314 A1* 7/2004 Jung ................... H04L 27/2618
370/203

(Continued)

*Primary Examiner* — Hassan Kizou
*Assistant Examiner* — Hashim Bhatti
(74) *Attorney, Agent, or Firm* — Garlick & Markison; Shayne X. Short (57) ABSTRACT

Selective processing of one or more packets to be transmitted from a wireless communication device to another wireless communication device is effective to reduce the peak to average power ratio (PAPR) of the transmission. The one or more packets are transmitted via two or more sub-bands of an available transmission medium. The number of coefficients or factors within that sequence corresponds to the number of sub-bands via which the one or more packets are to be transmitted. Also, a phase ramp or time-domain cyclic shift may be added to one or more of the packets after having undergone multiplication by one of the coefficients or factors within the sequence.

20 Claims, 7 Drawing Sheets

Related U.S. Application Data continuation-in-part of application No. 13/454,033, filed on Apr. 23, 2012, now Pat. No. 8,774,124.

(60) Provisional application No. 61/699,045, filed on Sep. 10, 2012, provisional application No. 61/750,280, filed on Jan. 8, 2013, provisional application No. 61/774,801, filed on Mar. 8, 2013, provisional application No. 61/809,656, filed on Apr. 8, 2013, provisional application No. 61/842,601, filed on Jul. 3, 2013, provisional application No. 61/478,537, filed on Apr. 24, 2011, provisional application No. 61/493,577, filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(51) Int. Cl.
*H04L 27/26* (2006.01)
*H04W 84/12* (2009.01)

(52) U.S. Cl.
CPC ......... *H04L 27/2666* (2013.01); *H04W 84/12* (2013.01); *Y02B 80/50* (2013.01)

(56) References Cited

U.S. PATENT DOCUMENTS

| | | | |
|---|---|---|---|
| 2005/0238110 A1* | 10/2005 | Yun | H04L 27/2618 375/260 |
| 2006/0078066 A1* | 4/2006 | Yun | H04B 7/068 375/299 |
| 2009/0190039 A1* | 7/2009 | Yun | H04L 25/03866 348/724 |
| 2011/0013583 A1* | 1/2011 | Yang | H04L 5/0023 370/330 |
| 2011/0069775 A1* | 3/2011 | Wu | H04B 7/0434 375/267 |
| 2011/0194544 A1* | 8/2011 | Yang | H04L 27/2613 370/338 |
| 2012/0224570 A1* | 9/2012 | Seok | H04L 5/0023 370/338 |
| 2014/0153507 A1* | 6/2014 | Yang | H04L 27/2602 370/329 |

* cited by examiner

PEAK TO AVERAGE POWER RATIO (PAPR) REDUCTION FOR REPETITION MODE WITHIN SINGLE USER, MULTIPLE USER, MULTIPLE ACCESS, AND/OR MIMO WIRELESS COMMUNICATION

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 13/954,492, entitled "Peak to average power ratio (PAPR) reduction for repetition mode within single user, multiple user, multiple access, and/or MIMO wireless communications," filed Jul. 30, 2013, and scheduled subsequently to be issued as U.S. Pat. No. 9,350,505 on May 24, 2016 (as indicated in an ISSUE NOTIFICATION mailed from the USPTO on May 4, 2016), which claims priority pursuant to 35 U.S.C. §119(e) to U.S. Provisional Application No. 61/699,045, entitled "Peak to average power ratio (PAPR) reduction for repetition mode within single user, multiple user, multiple access, and/or MIMO wireless communications," filed Sep. 10, 2012; U.S. Provisional Application No. 61/750,280, entitled "Peak to average power ratio (PAPR) reduction for repetition mode within single user, multiple user, multiple access, and/or MIMO wireless communications," filed Jan. 8, 2013; U.S. Provisional Application No. 61/774,801, entitled "Peak to average power ratio (PAPR) reduction for repetition mode within single user, multiple user, multiple access, and/or MIMO wireless communications," filed Mar. 8, 2013; U.S. Provisional Application No. 61/809,656, entitled "Peak to average power ratio (PAPR) reduction for repetition mode within single user, multiple user, multiple access, and/or MIMO wireless communications," filed Apr. 8, 2013; and U.S. Provisional Application No. 61/842,601, entitled "Peak to average power ratio (PAPR) reduction for repetition mode within single user, multiple user, multiple access, and/or MIMO wireless communications," filed Jul. 3, 2013; all of which are hereby incorporated herein by reference in their entirety and made part of the present U.S. Utility patent application for all purposes.

U.S. Utility application Ser. No. 13/954,492 also claims priority pursuant to 35 U.S.C. §120 as a continuation-in-part of U.S. Utility application Ser. No. 13/454,033, entitled "Device coexistence within single user, multiple user, multiple access, and/or MIMO wireless communications," filed on Apr. 23, 2012, now issued as U.S. Pat. No. 8,774,124 on Jul. 8, 2014, which claims priority pursuant to 35 U.S.C. §119(e) to U.S. Provisional Application No. 61/478,537, entitled "Preamble for use within multiple user, multiple access, and/or MIMO wireless communications," filed Apr. 24, 2011; U.S. Provisional Application No. 61/493,577, entitled "Preamble for use within multiple user, multiple access, and/or MIMO wireless communications," filed Jun. 6, 2011; U.S. Provisional Application No. 61/496,153, entitled "Preamble for use within multiple user, multiple access, and/or MIMO wireless communications," filed Jun. 13, 2011; U.S. Provisional Application No. 61/501,239, entitled "Preamble for use within multiple user, multiple access, and/or MIMO wireless communications," filed Jun. 26, 2011; U.S. Provisional Application No. 61/507,955, entitled "Preamble for use within multiple user, multiple access, and/or MIMO wireless communications," filed Jul. 14, 2011; U.S. Provisional Application No. 61/512,363, entitled "Preamble for use within multiple user, multiple access, and/or MIMO wireless communications," filed Jul. 27, 2011; U.S. Provisional Application No. 61/522,608, entitled "Preamble for use within multiple user, multiple access, and/or MIMO wireless communications," filed Aug. 11, 2011; U.S. Provisional Application No. 61/542,602, entitled "Preamble for use within single user, multiple user, multiple access, and/or MIMO wireless communications," filed Oct. 3, 2011; U.S. Provisional Application No. 61/561,722, entitled "Preamble for use within single user, multiple user, multiple access, and/or MIMO wireless communications," filed Nov. 18, 2011; U.S. Provisional Application No. 61/577,597, entitled "Preamble for use within single user, multiple user, multiple access, and/or MIMO wireless communications," filed Dec. 19, 2011; U.S. Provisional Application No. 61/584,142, entitled "Preamble for use within single user, multiple user, multiple access, and/or MIMO wireless communications," filed Jan. 6, 2012; U.S. Provisional Application No. 61/592,514, entitled "Preamble for use within single user, multiple user, multiple access, and/or MIMO wireless communications," filed Jan. 30, 2012; U.S. Provisional Application No. 61/595,616, entitled "Preamble for use within single user, multiple user, multiple access, and/or MIMO wireless communications," filed Feb. 6, 2012; U.S. Provisional Application No. 61/598,293, entitled "Preamble for use within single user, multiple user, multiple access, and/or MIMO wireless communications," filed Feb. 13, 2012; and U.S. Provisional Application No. 61/602,504, entitled "Preamble for use within single user, multiple user, multiple access, and/or MIMO wireless communications," filed Feb. 23, 2012; all of which are hereby incorporated herein by reference in their entirety and made part of the present U.S. Utility patent application for all purposes.

INCORPORATION BY REFERENCE

The following U.S. Utility patent applications are hereby incorporated herein by reference in their entirety and made part of the present U.S. Utility patent application for all purposes:

1. U.S. Utility patent application Ser. No. 13/453,703, entitled "Preamble for use within single user, multiple user, multiple access, and/or MIMO wireless communications," filed on Apr. 23, 2012, now issued as U.S. Pat. No. 9,184,969 on Nov. 10, 2015.

2. U.S. Utility patent application Ser. No. 13/453,998, entitled "Doppler adaptation using pilot patterns within single user, multiple user, multiple access, and/or MIMO wireless communications," filed on Apr. 23, 2012, now abandoned.

3. U.S. Utility patent application Ser. No. 13/454,010, entitled "Long training field (LTF) for use within single user, multiple user, multiple access, and/or MIMO wireless communications," filed on Apr. 23, 2012, now issued as U.S. Pat. No. 8,879,472 on Nov. 4, 2014.

4. U.S. Utility patent application Ser. No. 13/454,021, entitled "Short training field (STF) for use within single user, multiple user, multiple access, and/or MIMO wireless communications," filed on Apr. 23, 2012, now issued as U.S. Pat. No. 9,113,490 on Aug. 18, 2015.

5. U.S. Utility patent application Ser. No. 13/454,033, entitled "Device coexistence within single user, multiple user, multiple access, and/or MIMO wireless communications," filed on Apr. 23, 2012, now issued as U.S. Pat. No. 8,774,124 on Jul. 8, 2014.

BACKGROUND

Technical Field

The present disclosure relates generally to communication systems; and, more particularly, to repetition mode signaling within wireless communication systems including those having long range and low rate wireless links.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

In some instances, signals transmitted between devices can vary significantly in terms of magnitude and power as a function of time. When this happens, a receiver device may have difficulty in performing gain control and other functions required to process a received signal properly. For example, a wireless device's analog front end (AFE) may include functionality to perform automatic gain control (AGC) to accommodate a signal whose magnitude or power varies over time. However, when such variation is extreme, many receiver devices cannot properly track the signal to perform error-free processing of it.

DETAILED DESCRIPTION

Figure 1:
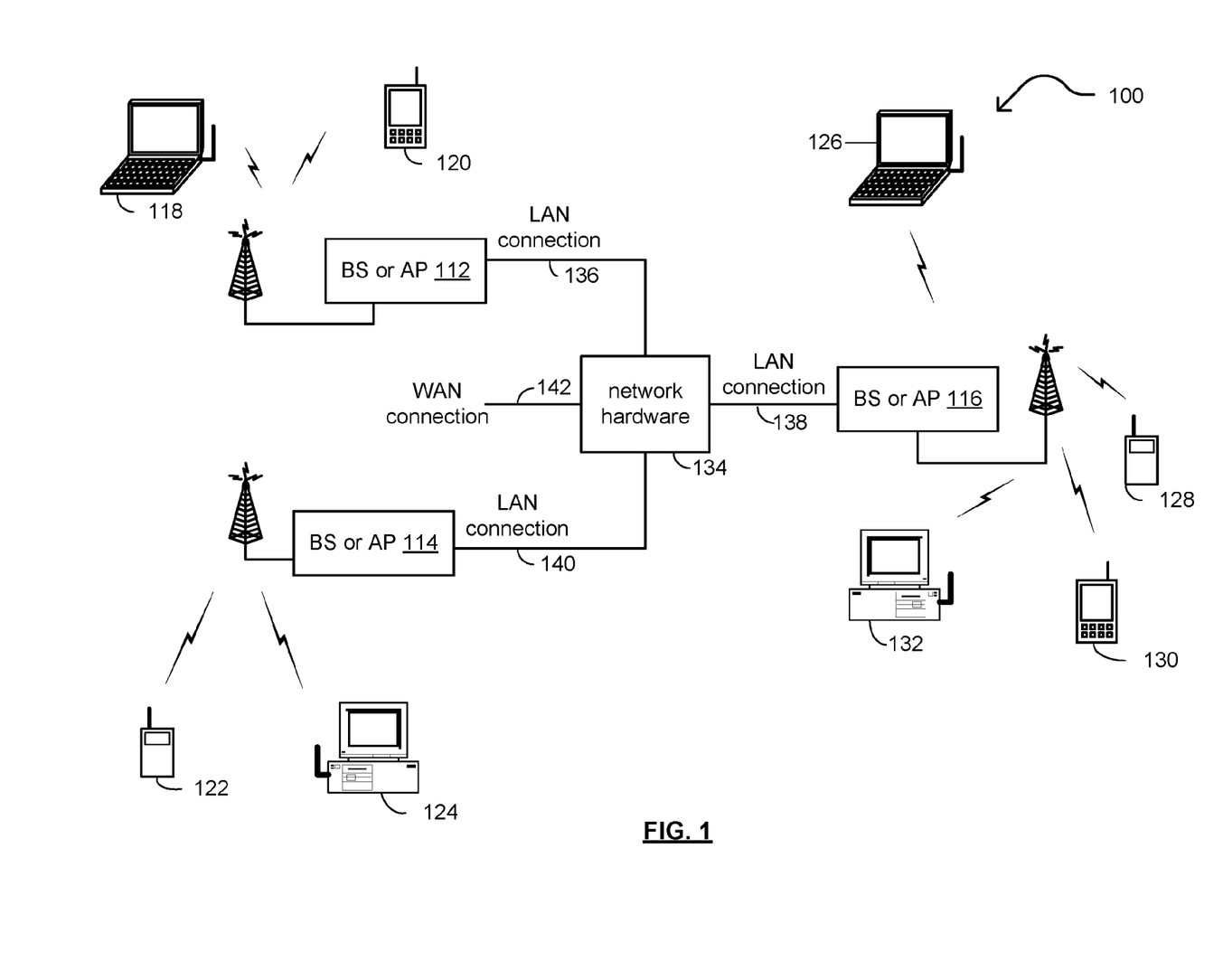
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., devices that include wireless stations (STAs), stand-alone wireless stations, and/or smart meter stations (SMSTAs)), and a network hardware component 134. The wireless communication devices 118-132 may be laptop computers, or tablets, 118 and 126, personal digital assistant 120 and 130, personal computer 124 and 132 and/or cellular telephone 122 and 128. The details of an embodiment of such wireless communication devices are described in greater detail with reference to FIG. 2.

The base stations (BSs) or access points (APs) 112-116 are operably coupled to the network hardware 134 via local area network connections 136, 38, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-114 to receive services from the communication system 100. For direct connections (i.e., point-to-point communications), wireless communication devices communicate directly via an allocated channel.

It is preferable to minimize the variation of magnitude or power of signals transmitted between the various devices (e.g., between wireless communication devices 118-132 themselves and/or the BSs or APs 112-116). One way to measure variation of a signal is peak to average power ratio (PAPR). PAPR is the ratio between the average power of a signal to the peak of that signal over some period of time. Generally, having a relatively minimize PAPR will provide for a higher likelihood of error-free, or acceptably low error, communications between devices.

In some instances, a given wireless device transmits a signal via two or more sub-bands of an available transmission medium (e.g., a wireless channel, a set of wireless channels, an allocated frequency band, or, as sometimes may be referred to as available bandwidth). This signal may include a packet and a repetition or duplicate of that packet (e.g., using a repetition signaling scheme) such that the packet is transmitted via a first sub-band and its duplicate is transmitted via a second sub-band. Considering one example of a modulation and coding scheme (MCS) employed wireless communication systems (e.g., wireless local area networks (WLANs), MCS0 rep2 (also understood as MCS10)

operates to transmit a given packet within two respective sub-bands (e.g., two respective sub-bands having 1 MHz bandwidth each). Unfortunately, transmitting packets in this matter can sometimes result in a relatively large PAPR and reduce the likelihood that a receiver device will properly process the signal.

In one approach to minimize the PAPR, each sub-band is multiplied by a constant coefficient or factor drawn out of the set $\{1, -1, j, -j\}$. For example, if the transmission is made using 2 sub-bands, then 2 coefficients or factors are drawn out of the set. In another example, if the transmission is made using 16 sub-bands, then 16 coefficients or factors are drawn out of the set. There may be instances in which more than one sub-band is multiplied by the same constant coefficient or factor drawn from the set. The group of coefficients or factors drawn out of the set may be viewed as a sequence that multiplies the various packets to be transmitted via the multiple sub-bands. For example, when two packets (e.g., the second packet may be a duplicate of the other) are to be transmitted via two sub-bands, then a two coefficient vector is used to multiply the packets. Alternatively, considering an example in which four packets are to be transmitted via for sub-bands, then a four coefficient vector is used about by the packets. Considering such a vector, the first vector element multiplies the packet to be transmitted via the first sub-band, the second vector element multiplies the packet to be transmitted via the second sub-band, and so on. Generally, any sized vector may be employed to multiply the various packets to be transmitted via respective sub-bands. Note also that a given coefficient or factor drawn out of the set mentioned above may occur more than once in any such sequence.

In another approach, in addition to performing the multiplication using a sequence as described above, a phase ramp may be added on a subset of the various sub-bands. In the time domain, such a phase ramp may be viewed as a cyclic shift (e.g., a cyclic shift delay (CSD)) to be applied to one or more, but less than all, of the packets to be transmitted via the sub-bands. A phase ramp or time domain cyclic shift breaks the repetition associated with the duplication or repetition signaling by a slight time cyclic shift. This can further assist a receiver device to perform accurate receipt and processing of a signal transmitted via multiple sub-bands. Note also that the use of a phase ramp or time domain cyclic shift will not adversely impact packet classification as may be classification performed within WLAN systems. For example, certain WLANs include devices compliant with different respective communication protocols (e.g., a relatively newer protocol and a legacy or prior protocol). Also, certain communication protocols may include more than one preamble type (e.g., one protocol may employ two or more preamble types). Within such situations, a device may need to discriminate between packets of different preamble types as well as packets associated with different communication protocols. For example, long training field (LTF) classification may be used within a given communication protocol to distinguish between two different preamble types, and a phase ramp or time domain cyclic shift will not interfere with such classification.

Generally, the PAPR within transmissions made from any of the various devices in this diagram (e.g., wireless communication devices 118-132 themselves and/or the BSs or APs 112-116) may be reduced or minimized using one or both of these approaches described above. This can assist a receiving device's likelihood to receive and properly process signals transmitted from other devices.

Figure 2:
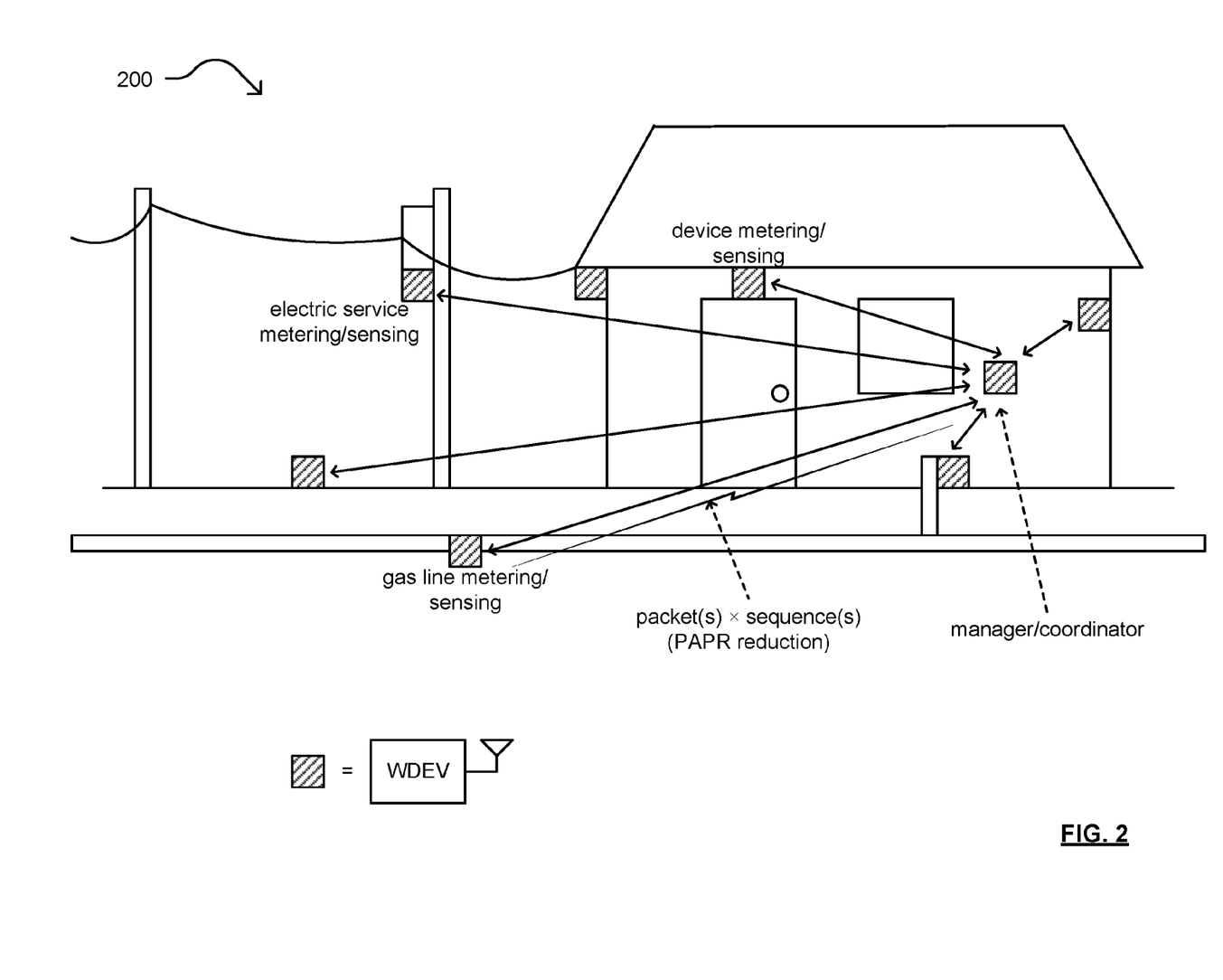
FIG. 2 is a diagram illustrating an embodiment of a number of wireless communication devices, some operative as smart meter stations (SMSTAs).

FIG. 2 is a diagram illustrating an embodiment 200 of a number of wireless communication devices, some operative as smart meter stations (SMSTAs). The SMSTA are implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices (e.g., from the SMSTAs to an AP).

A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may transmit such information to another wireless communication device (e.g., an access point (AP), another SMSTA, a wireless station (STA), or such an SMSTA or STA operating as an AP, etc.).

In an SMSTA environment, multiple respective wireless communication devices (e.g., SMSTAs) can be implemented to forward monitoring and/or sensing related information to one particular wireless communication device that operates as a manager, coordinator, etc. such as may be implemented by an access point (AP) or a wireless station (STA) operating as an AP. Such SMSTAs may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes. Communications from SMSTAs may be very important and yet performed quite infrequently.

Currently developing protocols/standards adapted for such metering applications are intended for long range and low rate applications operating in the worldwide spectrum below 1 GHz. The available spectrum in each country differs and requires flexible design to accommodate different options, and such long range and low rate applications are designed to accommodate longer delay spreads which can be associated with lower data rate applications.

Within such metering applications, failure to receive or properly process a received signal can be very problematic. Within such metering applications, many of the metering/sensing devices only transmit to the manager/coordinator device occasionally. The information transmitted can be highly valuable (e.g., items of revenue metering, system modification, safety-related concerns, etc.). If a given transmission from a given metering/sensing device is not properly received and processed by the manager-coordinator device, it may be a relatively long period of time before that same metering/sensing device transmits subsequent information. The overall performance of such a system can suffer significantly when information is not received by the manager/coordinator device.

A metering/sensing device may multiply one or more packets by a sequence (e.g., that includes two or more constant coefficients or factors drawn out of the set $\{1, -1, j, -j\}$) to generate two or more packets having an overall reduced or minimized PAPR. The metering/sensing device then transmits the two or more resulting packets (after undergoing multiplication by the sequence) are then transmitted respectively via two or more sub-bands. For example, a first packet is transmitted via a first sub-band, a second packet is transmitted via a second sub-band, and so on. This can increase the likelihood that the manager-coordinator device will properly receive and be able to process a transmission that includes those one or more packets.

Figure 3:
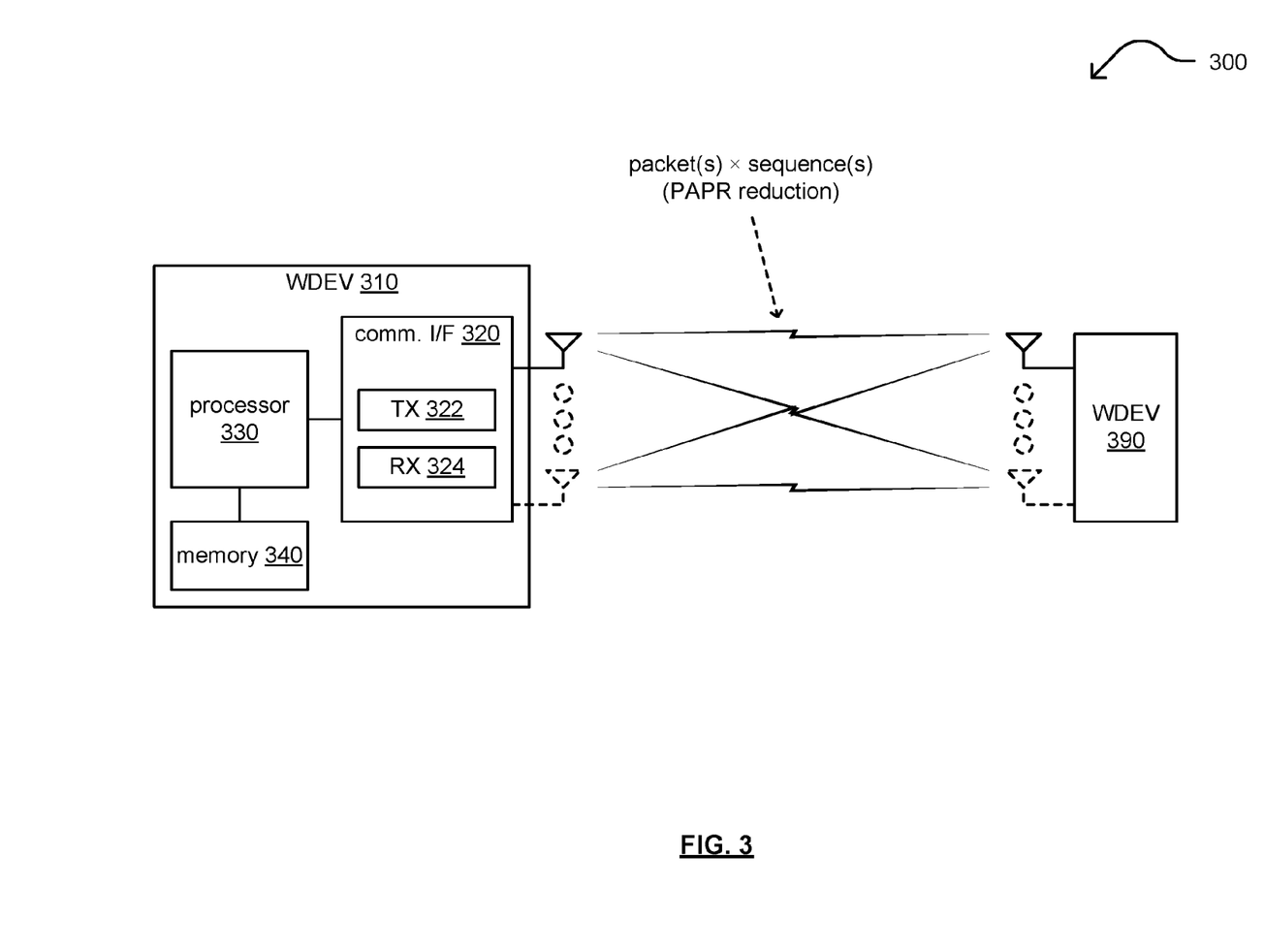
FIG. 3 is a diagram illustrating an example of communication between wireless communication devices.

FIG. 3 is a diagram illustrating an example 300 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of one or more frames (e.g., using a transmitter 322 and a receiver 324). The wireless communication device 310 also includes a processor 330, and an associated memory 340, to execute various operations including interpreting one or more frames transmitted to wireless communication device 390 and/or received from the wireless communication device 390. The wireless communication devices 310 and 390 may be implemented using one or more integrated circuits in accordance with any desired configuration or combination or components, modules, etc. within one or more integrated circuits.

The device 310's processor 330 is configured to generate a packet for transmission to device 390. This transmission is made via a number of sub-bands of an available transmission medium. In one example, the sub-bands each have a bandwidth of approximately 1 MHz. Generally, any desired channelization of the available transmission medium into two or more sub-bands may be performed. The processor 330 also operates to multiply the packet by a sequence to generate two or more packets. The sequence includes two or more constant coefficients or factors drawn out of the set $\{1, -1, j, -j\}$; and appropriately selected sequence operates to reduce or minimize PAPR among the two or more packets. The communication interface 320 is configured to transmit the two or more packets (e.g., via a continuous time signal generated from or based on the two more packets) respectively via the two or more sub-bands.

Figure 4:
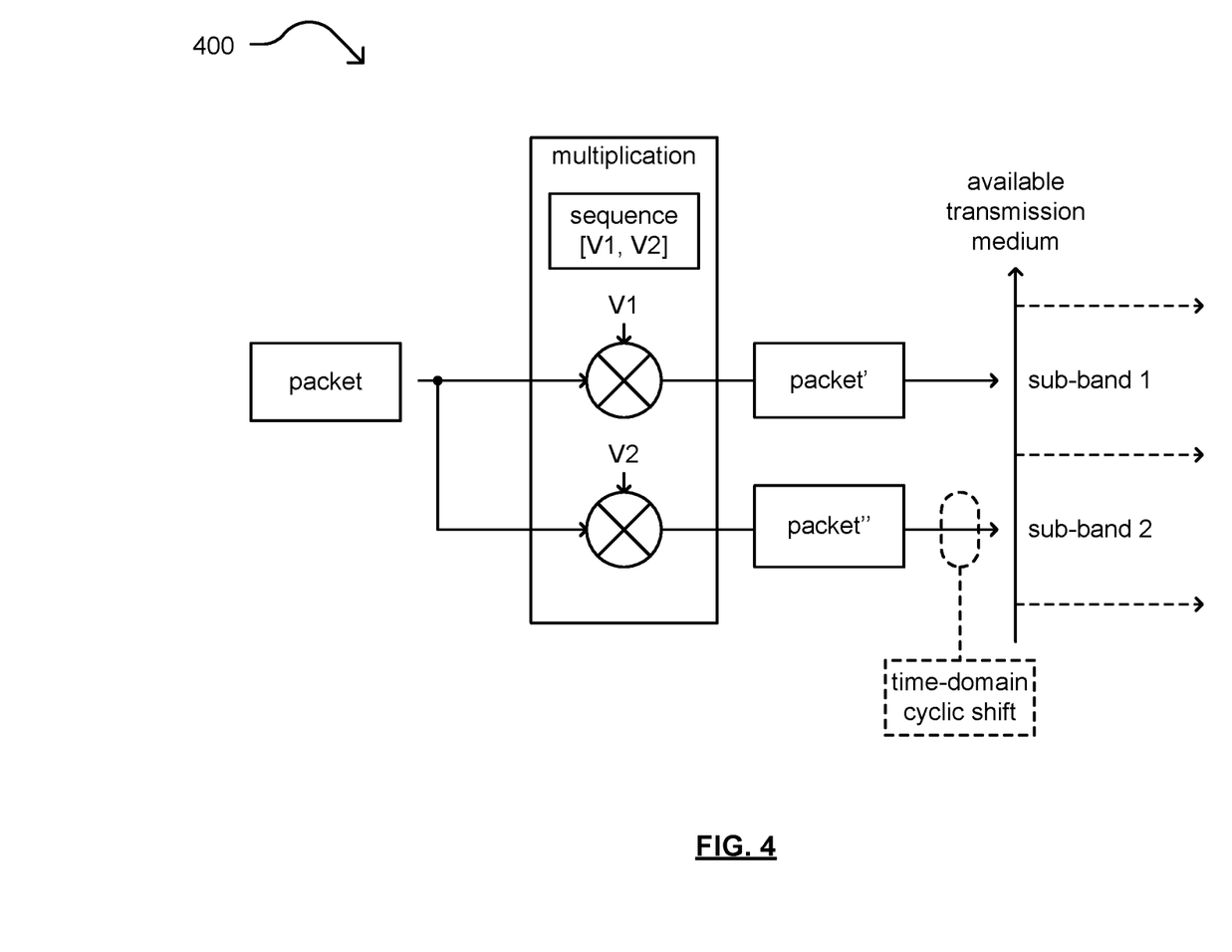
FIG. 4 is a diagram illustrating an example of processing to reduce peak to average power ratio (PAPR) within a transmission that includes the packet.

FIG. 4 is a diagram illustrating an example 400 of processing to reduce peak to average power ratio (PAPR) within a transmission that includes the packet. A packet undergoes multiplication by a sequence that includes two respective values therein. The sequence of this diagram is shown as including values V1 and V2, which may be drawn out of the set $\{1, -1, j, -j\}$ or other set. The multiplication generates two packets shown as packet' and packet". When the multiplication value is 1, then the resulting packet is the same as before undergoing multiplication. The first packet, packet', is transmitted via a first sub-band within an available transmission medium, and the second packet, packet", is transmitted via a second sub-band within the available transmission medium. In certain instances, a phase ramp or time-domain cyclic shift is added to one of the two packets resulting from multiplication. This diagram shows a time-domain cyclic shift that may be added to the second packet, packet".

Figure 5:
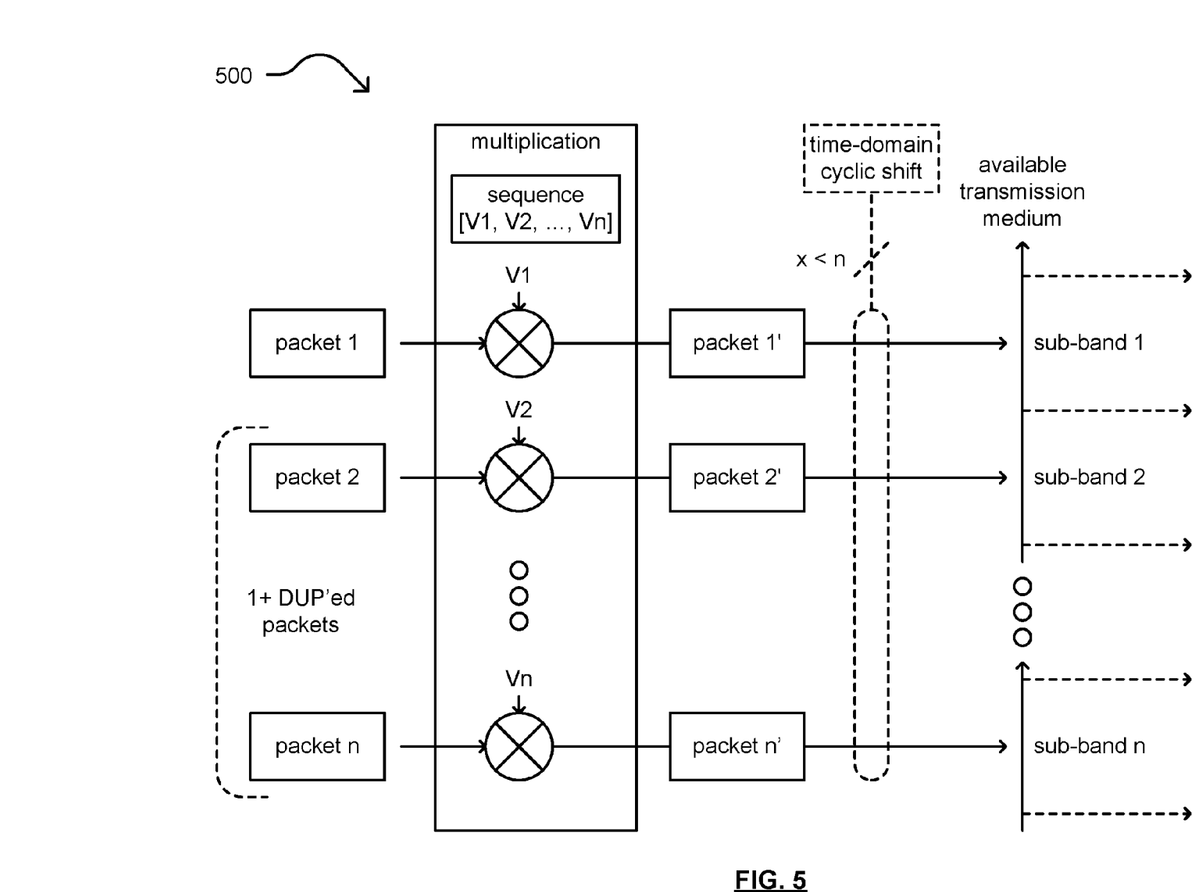
FIG. 5 is a diagram illustrating another example of processing to reduce PAPR within a transmission that includes one or more packets.

FIG. 5 is a diagram illustrating another example 500 of processing to reduce PAPR within a transmission that includes one or more packets. A number of packets (e.g., packet 1, 2, up to n) undergo multiplication by a sequence that includes n respective values therein. Any one of the packets may be a duplicate of another one of the packets such as in accordance with repetition or duplicate mode signaling (e.g., DUP transmission mode). The sequence of this diagram is shown as including values V1, V2, and so on up to Vn. The values of the sequence are drawn out of the set $\{1, -1, j, -j\}$.

The multiplication of the various packets 1-$n$ generates n packets shown as packet 1', packet 2, up to packet n'. Packet 1' is transmitted via a first sub-band. Packet 2' is transmitted via a second sub-band. This process continues for any other intervening packets until packet n' is transmitted via an n-th sub-band.

In some examples, a phase ramp or time-domain cyclic shift is added to one or more of the packets resulting from multiplication. This diagram shows how different respective time-domain cyclic shifts may be added to any subset of the packets 1'-n' (e.g., such that x time-domain cyclic shifts may be added to x packets, which is fewer than n of the packets 1'-n').

Efficient Implementation

Cyclic shift delay (CSD) may be performed using multiplication in the frequency domain and can burden cheap sensor type implementations (e.g., smart meter stations (SMSTAs) of relatively low complexity or sophistication). CSD means multiplication by a factor $\exp(j2\pi\Delta fk\tau)$ or $e^{(j2\pi\Delta fk\tau)}$, where k runs on tone number, $\Delta f$ is the tone spacing and $\tau$ is the CSD value.

A novel alternative implementation of the 1 MHz DUP mode signal that doesn't require multiplication is presented here. One example operates on a 2 MHz signal channel (e.g., a transmission medium having a 2 MHz bandwidth) case (e.g., 1 MHz sub-band that is duplicated twice). Extensions to higher widths channels of higher BWs are possible and can be implemented straightforwardly as the reader will understand.

Various aspects, embodiments, and/or their equivalents, of the invention may be implemented such that CSD can be easily implemented in the time domain as a cyclic shift and adding a frequency shifted 1 MHz signal can also be implemented in the time domain in a simple way since 1 MHz frequency shift corresponds to a multiplication by a sequence of alternating +/−1 signs for a signal sampled at 2 MHz.

The following mathematical formulation shows the equivalency of the two methods. On the left hand side is the traditional way of generating a 1 MHz Dup mode when a subset (e.g., one half) adds a CSD as proposed herein. The IFFT works on 64 tones, the right hand side is duplicating the left hand side 32 values and multiplies by the cyclic shift value. Alternatively, the signal A is generated which is a 64 size IFFT of just the 32 data tones and then create the second part by frequency shifting to create signal B and then apply a cyclic shift in the time domain to create signal C. Note that 1 µs (micro-seconds) corresponds in this case to n=2.

$$IFFT([\text{data}(1:32)\text{data}(1:32)\times\exp(j2\pi\Delta f(1:32)\tau)])=A+C$$

$$A=IFFT([\text{data}(1:32)\text{data}(1:32)])$$

$$B=A\times[1,-1,1,-1,\ldots]$$

$$C=B([n+1:64,1:n])$$

As may be understood, with respect to the use of B, this is not really a multiplication (e.g., it just really changes the sign and effectively shifts by 1 MHz). A frequency shift in the frequency domain may be achieved with relatively low complexity and effort. Also, the value C corresponds to the actual cyclical shift.

Presented is a proposal of CSD levels of [0, −1] μsec and [0, −1, 0, −1] μsec for 2 MHz and 4 MHz DUP transmission modes respectively on top of the 11ac rotation sequences in order to reduce DATA PAPR. As may be understood, this mode can be used for range extension where very low power amplifier (PA) backoff is desirable (e.g., reduction of the power amplification within a PA, such as implemented within an analog front end (AFE) of a communication device).

Presented is a proposal of CSD levels of [0, −1, 0, −1, 0, −1, 0, −1] μsec for 8 MHz DUP transmission mode on top of a modified rotation sequences as follows [1 −1 −1 −1 1 −1 1 1] in order to reduce DATA PAPR. An alternative for 8 MHz is [1 −1 −1 1 −1 1 1 1], which may provide for better or best performance.

Presented is a proposal of CSD levels of [0, −1, 0, −1, 0, −1, 0, −1, 0, −1, 0, −1, 0, −1, 0, −1] μsec for 16 MHz DUP transmission mode on top of a modified rotation sequences as follows [1 −1 −1 −1 1 −1 1 1 1 −1 −1 −1 −1 1 −1 −1] in order to reduce DATA PAPR.

Specifically for 2 MHz DUP Transmission Modes:

In one example, CSD levels of [0, −1] μsec and [0, −1, 0, −1] μsec for 4 MHz and 8 MHz DUP transmission modes are respectively added on top of the 11ac rotation sequences in order to reduce DATA PAPR.

In another example, CSD levels of [0, −1, 0, −1, 0, −1, 0, −1] μsec for 16 MHz DUP transmission mode are respectively added on top of a modified rotation sequences as follows [1 −1 −1 −1 1 −1 1 1] in order to reduce DATA PAPR.

Presented also is a proposal of a new STF sequence with 1 dB PAPR to replace the STF sequence used for 1 MHz transmission.

DUP Modes PAPR Analysis and Metric

A signal generated using repetition or duplication signaling (e.g., a DUP signal generated using DUP transmission mode) may be written as a time domain vector product (e.g., with 4 reps) of two terms. As an example, this equation shows a signal duplicated 4 times:

$$IFFT([Xc_1Xc_2Xc_3X])=Y[1+c_1\exp(j2\pi n\Delta f/F_s)+c_2\exp(j2\pi n2\Delta f/F_s)+c_3\exp(j2\pi n3\Delta f/F_s)]]$$

where X is the frequency domain duplicated signal, coefficients $c_i$ (i.e., $c_1$, $c_2$, etc.) are used to reduce the PAPR. Without loss of generality, the first coefficient is 1. The term $\Delta f$ is the frequency offset between the duplicated parts (e.g., 1 MHz sub-bands in the case of 1 MHz DUP). The term $F_s$ is the oversampling frequency (e.g., typically at least 4× of the bandwidth of the signal channel, such as at least 16 MHz in the case of 4 MHz). The term Y represents the oversampled time domain signal of the basic signal X, and n runs on samples.

Note that this representation is comprised of a random signal Y which is independent of a second term that is a weighted sum of complex signals. This means that optimal coefficients will most likely be independent of the underlying signal X (1 MHz DUP, 2 MHz DUP or any other signal) provided that the signal is truly random.

Of particular interest is the PAPR of the product signal $P_r(Y[\ldots]>Th)$. Due to the independency of the two terms, focus can be made for coefficients that minimize the variation (PAPR) of the complex signals because that will lead to reduced PAPR of the product. Various metrics can be used to measure the variability of the signal below such as PAPR or standard deviation.

$$[1+c_1\exp(j2\pi n\Delta f/F_s)+c_2\exp(j2\pi n2\Delta f/F_s)+c_3\exp(j2\pi n3\Delta f/F_s)]$$

Figure 6A:
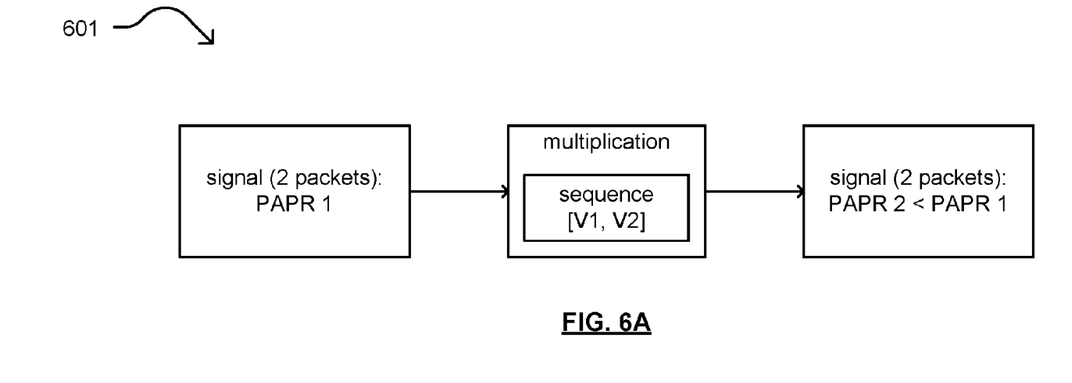
FIG. 6A is a diagram illustrating an example of a signal undergoing multiplication by a sequence to reduce the signal's PAPR.

FIG. 6A is a diagram illustrating an example 601 of a signal undergoing multiplication by a sequence to reduce the signal's PAPR. A signal that includes two packets to be transmitted via two sub-bands has a first PAPR. Multiplication of that signal by an appropriately selected sequence (e.g., values V1 and V2 drawn out of the set {1, −1, j, −j}) is effective to reduce the PAPR to a second value that is relatively less than the first PAPR.

Figure 6B:
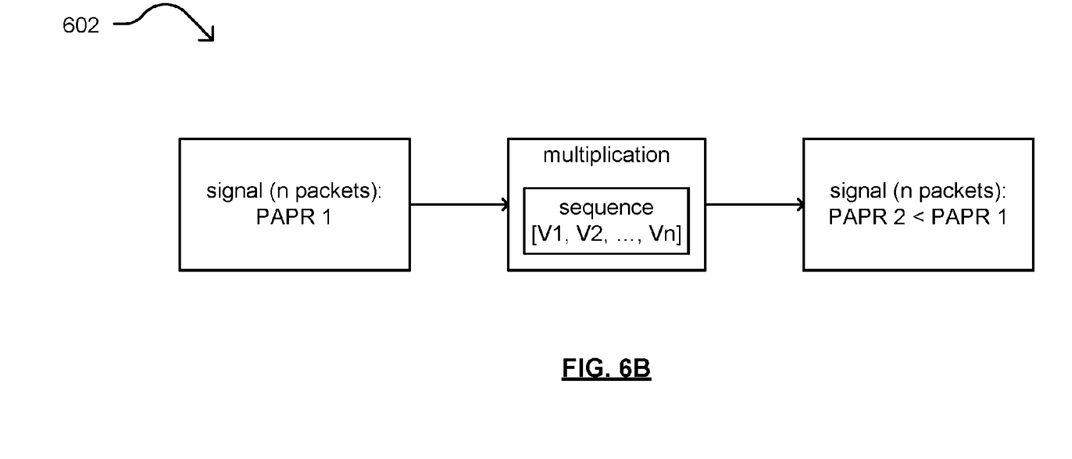
FIG. 6B is a diagram illustrating an example of a signal undergoing multiplication by a sequence to reduce the signal's PAPR.

FIG. 6B is a diagram illustrating an example 602 of a signal undergoing multiplication by a sequence to reduce the signal's PAPR. A signal that includes n packets to be transmitted via n sub-bands has a first PAPR. Multiplication of that signal by an appropriately selected sequence (e.g., values V1, V2, up to Vn drawn out of the set {1, −1, j, −j}) is effective to reduce the PAPR to a second value that is relatively less than the first PAPR.

Generally, any desired number of packets may be transmitted via that any desired number of sub-bands. When operating using a repetition or duplicate mode of signaling, an appropriately selected sequence is effective to reduce the PAPR of a transmission composed of those packets to be transmitted via those sub-bands.

Figure 7A:
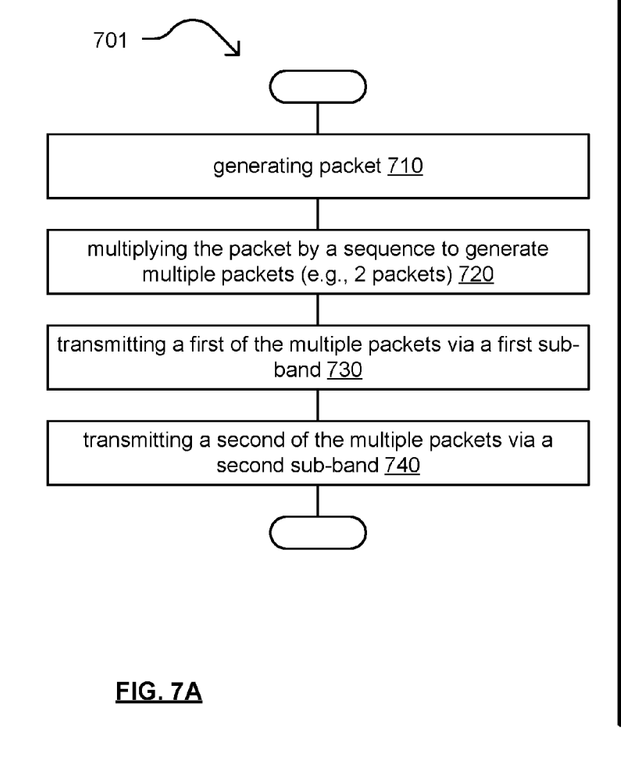
FIG. 7A is a diagram illustrating an embodiment of a method for execution by one or more wireless communication devices.

FIG. 7A is a diagram illustrating an embodiment of a method 701 for execution by one or more wireless communication devices. Method 701 begins by generating a packet (e.g., using a processor within a wireless communication device), as shown in a block 710. The method 701 continues by multiplying the packet by a sequence to generate multiple packets (e.g., 2 packets), as shown in a block 720.

The method 701 then operates by transmitting a first of the multiple packets via a first sub-band of an available transmission medium, as shown in a block 730. The method 701 continues by transmitting a second of the multiple packets via a second sub-band of the available transmission medium, as shown in a block 740.

Figure 7B:
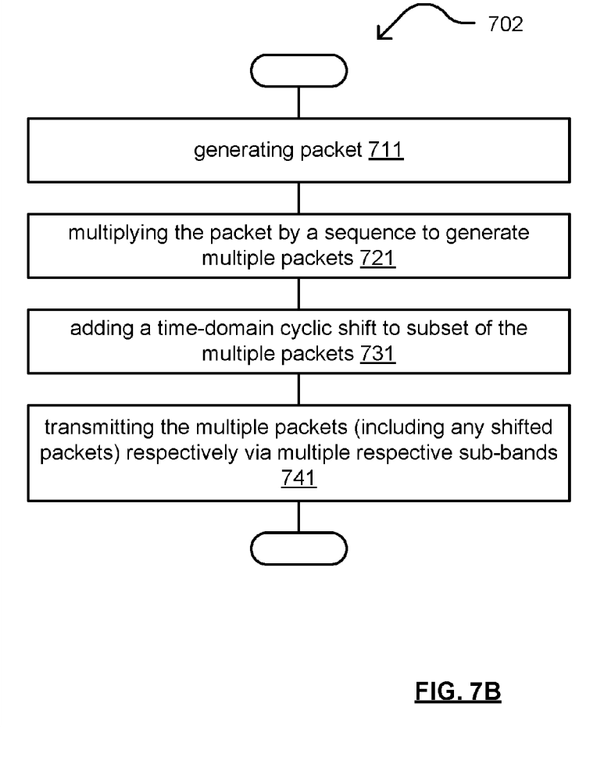
FIG. 7B is a diagram illustrating another embodiment of a method for execution by one or more wireless communication devices.

FIG. 7B is a diagram illustrating another embodiment of a method 702 for execution by one or more wireless communication devices. Method 702 begins by generating a packet (e.g., using a processor within a wireless communication device), as shown in a block 711. The method 702 continues by multiplying the packet by a sequence to generate multiple packets, as shown in a block 721. The method 702 then operates by adding a time-domain cyclic shift to subset (e.g., one or more and less than fewer of all) of the multiple packets, as shown in a block 731. The method 702 continues by transmitting the multiple packets (including any shifted packets) respectively via multiple respective sub-bands of the available transmission medium, as shown in a block 741.

It is noted that the various operations and functions described within various methods herein may be performed within a wireless communication device (e.g., such as by the processor 330 and communication interface 320 as described with reference to FIG. 3 and/or other components therein). Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a communication interface configured to receive a first packet via a first sub-band of a plurality of sub-bands and a second packet via a second sub-band of the plurality of sub-bands from another wireless communication device, wherein the first packet is multiplied by a sequence within the another wireless communication device to generate the second packet, wherein the sequence is effective to reduce or minimize peak to average power ratio (PAPR) of the second packet, and wherein the sequence includes at least two coefficients selected from a set that includes 1, −1, j, and −j; and
   a processing circuitry configured to process the first packet and the second packet to recover information included therein.

2. The wireless communication device of claim 1, wherein the first sub-band of the plurality of sub-bands and the second sub-band of the plurality of sub-bands are of substantially same size.

3. The wireless communication device of claim 1, wherein at least one of the first packet or the second packet is time domain cyclic shifted within the another wireless communication device.

4. The wireless communication device of claim 1, wherein the communication interface is further configured to:
   receive a third packet via the first sub-band of the plurality of sub-bands and a fourth packet via the second sub-band of the plurality of sub-bands from the another wireless communication device, wherein the third packet is multiplied by the sequence within the another wireless communication device to generate the fourth packet.

5. The wireless communication device of claim 1, wherein the communication interface is further configured to:
   receive a third packet via the first sub-band of the plurality of sub-bands, a fourth packet via the second sub-band of the plurality of sub-bands from the another wireless communication device, a fifth packet via a third sub-band of the plurality of sub-bands, and a sixth packet via a fourth sub-band of the plurality of sub-bands from the another wireless communication device, wherein the third packet is multiplied by another sequence within the another wireless communication device to generate the fourth packet, the fifth packet, and the sixth packet, wherein the another sequence is effective to reduce or minimize PAPR of the at least one of the fourth packet, the fifth packet, or the sixth packet, and wherein the another sequence includes at least four coefficients selected from the set that includes 1, −1, j, and −j.

6. The wireless communication device of claim 5, wherein the first sub-band of the plurality of sub-bands, the second sub-band of the plurality of sub-bands, the third sub-band of the plurality of sub-bands, and the fourth sub-band of the plurality of sub-bands are of substantially same size.

7. The wireless communication device of claim 1 further comprising:
   a laptop computer, a tablet, a personal digital assistant, a personal computer, or a cellular telephone.

8. The wireless communication device of claim 1 further comprising:
   a wireless station (STA) or a smart meter station (SM-STA), wherein the another wireless communication device includes an access point (AP).

9. A wireless communication device comprising:
   a communication interface configured to receive a first packet via a first sub-band of a plurality of sub-bands and a second packet via a second sub-band of the plurality of sub-bands from another wireless communication device, wherein the first packet is multiplied by a sequence within the another wireless communication device to generate the second packet, wherein the sequence is effective to reduce or minimize peak to average power ratio (PAPR) of the first packet and the second packet, wherein the sequence includes at least two coefficients selected from a set that includes 1, −1, j, and −j, wherein at least one of the first packet or the second packet is time domain cyclic shifted within the another wireless communication device, and wherein the first sub-band of the plurality of sub-bands and the second sub-band of the plurality of sub-bands are of substantially same size; and
   a processing circuitry configured to process the first packet and the second packet to recover information included therein.

10. The wireless communication device of claim 9, wherein the communication interface is further configured to:
    receive a third packet via the first sub-band of the plurality of sub-bands and a fourth packet via the second sub-band of the plurality of sub-bands from the another wireless communication device, wherein the third packet is multiplied by the sequence within the another wireless communication device to generate the fourth packet.

11. The wireless communication device of claim 9, wherein the communication interface is further configured to:
    receive a third packet via the first sub-band of the plurality of sub-bands, a fourth packet via the second sub-band of the plurality of sub-bands from the another wireless communication device, a fifth packet via a third sub-band of the plurality of sub-bands, and a sixth packet via a fourth sub-band of the plurality of sub-bands from the another wireless communication device, wherein the third packet is multiplied by another sequence within the another wireless communication device to generate the fourth packet, the fifth packet, and the sixth packet, wherein the another sequence is effective to reduce or minimize PAPR of at least one of the fourth packet, the fifth packet, and or the sixth packet, wherein the another sequence includes at least four coefficients selected from the set that includes 1, −1, j, and −j, and wherein the first sub-band of the plurality of sub-bands, the second sub-band of the plurality of sub-bands, the third sub-band of the plurality of sub-bands, and the fourth sub-band of the plurality of sub-bands are of substantially same size.

12. The wireless communication device of claim 9 further comprising:
a laptop computer, a tablet, a personal digital assistant, a personal computer, or a cellular telephone.

13. The wireless communication device of claim 9 further comprising:
a wireless station (STA) or a smart meter station (SM-STA), wherein the another wireless communication device includes an access point (AP).

14. A method for execution by a wireless communication device, the method comprising:
receiving, via a communication interface of the wireless communication device, a first packet via a first sub-band of a plurality of sub-bands and a second packet via a second sub-band of the plurality of sub-bands from another wireless communication device, wherein the first packet is multiplied by a sequence within the another wireless communication device to generate the second packet, wherein the sequence is effective to reduce or minimize peak to average power ratio (PAPR) of the first packet and the second packet, and wherein the sequence includes at least two coefficients selected from a set that includes 1, −1, j, and −j; and
processing the first packet and the second packet to recover information included therein.

15. The method of claim 14, wherein the first sub-band of the plurality of sub-bands and the second sub-band of the plurality of sub-bands are of substantially same size.

16. The method of claim 14, wherein at least one of the first packet or the second packet is time domain cyclic shifted within the another wireless communication device.

17. The method of claim 14 further comprising:
receiving, via the communication interface of the wireless communication device, a third packet via the first sub-band of the plurality of sub-bands and a fourth packet via the second sub-band of the plurality of sub-bands from the another wireless communication device, wherein the third packet is multiplied by the sequence within the another wireless communication device to generate the fourth packet.

18. The method of claim 14 further comprising:
receiving, via the communication interface of the wireless communication device, a third packet via the first sub-band of the plurality of sub-bands, a fourth packet via the second sub-band of the plurality of sub-bands from the another wireless communication device, a fifth packet via a third sub-band of the plurality of sub-bands, and a sixth packet via a fourth sub-band of the plurality of sub-bands from the another wireless communication device, wherein the third packet is multiplied by another sequence within the another wireless communication device to generate the fourth packet, the fifth packet, and the sixth packet, wherein the another sequence is effective to reduce or minimize PAPR of at least one of the fourth packet, the fifth packet, and or the sixth packet, and wherein the another sequence includes at least four coefficients selected from the set that includes 1, −1, j, and −j.

19. The method of claim 18, wherein the first sub-band of the plurality of sub-bands, the second sub-band of the plurality of sub-bands, the third sub-band of the plurality of sub-bands, and the fourth sub-band of the plurality of sub-bands are of substantially same size.

20. The method of claim 14, wherein the wireless communication device includes a wireless station (STA) or a smart meter station (SMSTA), and the another wireless communication device includes an access point (AP).

\* \* \* \* \*